US012606927B2

(12) United States Patent
Joung et al.

(10) Patent No.: US 12,606,927 B2
(45) Date of Patent: Apr. 21, 2026

(54) FUNCTIONAL MATERIAL AND METHOD FOR MANUFACTURING THE SAME

(71) Applicant: SOOKMYUNG WOMEN'S UNIVERSITY INDUSTRY-ACADEMIC COOPERATION FOUNDATION, Seoul (KR)

(72) Inventors: Young Soo Joung, Seoul (KR); Jee Yoon Kim, Seoul (KR); Hyun Jung Lee, Seoul (KR); Yeon Ha Cho, Seoul (KR)

(73) Assignee: SOOKMYUNG WOMEN'S UNIVERSITY INDUSTRY-ACADEMIC COOPERATION FOUNDATION, Seoul (KR)

( * ) Notice: Subject to any disclaimer, the term of this patent is extended or adjusted under 35 U.S.C. 154(b) by 1167 days.

(21) Appl. No.: 17/440,306

(22) PCT Filed: Feb. 24, 2020

(86) PCT No.: PCT/KR2020/002604
§ 371 (c)(1),
(2) Date: Sep. 17, 2021

(87) PCT Pub. No.: WO2020/189905
PCT Pub. Date: Sep. 24, 2020

(65) Prior Publication Data
US 2022/0145487 A1 May 12, 2022

(30) Foreign Application Priority Data
Mar. 18, 2019 (KR) ........................ 10-2019-0030763

(51) Int. Cl.
*C25D 13/04* (2006.01)
*B05D 5/12* (2006.01)
(Continued)

(52) U.S. Cl.
CPC .............. *C25D 13/04* (2013.01); *C08K 3/015* (2018.01); *C09D 5/002* (2013.01); *C09D 5/14* (2013.01);
(Continued)

(58) Field of Classification Search
CPC . C25D 13/04; C09D 7/65; C09D 7/45; C09D 5/002; C09D 5/14; C09D 5/4492;
(Continued)

(56) References Cited

U.S. PATENT DOCUMENTS

2013/0312141 A1* 11/2013 De Block .......... C12N 15/8246
428/221
2015/0376811 A1* 12/2015 Joung .................... C25D 13/18
524/588
(Continued)

FOREIGN PATENT DOCUMENTS

EP        846418 B1 *  8/2006  ............. A01N 25/10
JP    2005-330638      12/2005
JP    2006341475 A  * 12/2006

OTHER PUBLICATIONS

S.S. Ugur et al. "Fabrication of ZnO Nanoparticle-Based Thin Films on Cotton Fabrics for Antibacterial Purpose". Süleyman Demirel Üniversitesi, Fen Bilimleri Enstitüsü Dergisi, 2010, 14-1, p. 95-103 Abstract in English (Year: 2010).*
(Continued)

*Primary Examiner* — James Lin
*Assistant Examiner* — Kevin Sylvester

(57) ABSTRACT
The present invention relates to a material having various functions such as antimicrobial function or waterproof func-
(Continued)

tion, as well as a method and an apparatus for manufacturing the same. The method for manufacturing a functional material according to the present invention includes coating a surface of conductive or non-conductive material with an electrically charged microfine material having a size of nano- or micro-units, thereby imparting functionality to the material simultaneously with maintaining intrinsic properties thereof.

In addition, the method for manufacturing a functional material, according to the present invention, had advantages in which: repeating a process of coating the surface of the conductive or non-conductive material with a functional substance can impart a plurality of desired functions to the material, in addition, a thickness of the functional material may be easily adjusted, and a large area/large quantity may be produced by a simplified process using a general material in a short period.

15 Claims, 9 Drawing Sheets

(51) Int. Cl.

| | |
|---|---|
| *C08K 3/015* | (2018.01) |
| *C09D 5/00* | (2006.01) |
| *C09D 5/14* | (2006.01) |
| *C09D 5/44* | (2006.01) |
| *C09D 7/45* | (2018.01) |
| *C09D 7/65* | (2018.01) |
| *C09D 125/18* | (2006.01) |
| *C09D 147/00* | (2006.01) |
| *D06N 3/00* | (2006.01) |

(52) U.S. Cl.
CPC ............. *C09D 5/4492* (2013.01); *C09D 7/45* (2018.01); *C09D 7/65* (2018.01); *C09D 125/18* (2013.01); *C09D 147/00* (2013.01); *D06N 3/0088* (2013.01); *B05D 5/12* (2013.01)

(58) Field of Classification Search
CPC ... C09D 125/18; C09D 147/00; D06N 3/0088
See application file for complete search history.

(56) References Cited

U.S. PATENT DOCUMENTS

2018/0353433 A1* 12/2018 Tuteja .................. A61K 9/5073
2018/0355552 A1* 12/2018 Hung ................... D06N 3/0038

OTHER PUBLICATIONS

Young Soo Joung and Cullen R. Buie, "Antiwetting Fabric Produced by a Combination of Layer-by-Layer Assembly and Electrophoretic Deposition of Hydrophobic Nanoparticles", ACS Appl. Mater. Interfaces, 2015, 7, p. 20100-20110. (Year: 2015).*

Sakka et al., "Electrophoretic Deposition Behavior of Aqueous Nanosized Zinc Oxide Suspensions". J. Am. Ceram. Soc., 2002, 85, p. 2161-65. (Year: 2002).*

Flores et al., "Antimicrobial behavior of novel surfaces generated by electrophoretic deposition and breakdown anodization", Colloids and Surfaces B: Biointerfaces, 2014, 134, p. 204-212. (Year: 2015).*

Vijayalakshmi et al., "Synthesis and In-Vitro Electrochemical Study of Composite Coatings on Implant by Electrophoretic Deposition", J. Indian Chem. Sci., 2015, 92(4), p. 501-504. (Year: 2015).*

Shiryaev et al. ("ZnO Nanoparticles Modification by PEI for Biomolecule Conjugation," Nanotechnol. Russia 2017, 12(11-12), 613-618). (Year: 2017).*

Jin et al. ("Superhydrophobic and Antibacterial Properties of Cotton Fabrics Treatded with PVDF and nano-ZnO through Phase Inversion," Fibers and Polymers 2018, 19(9), 1835-1842). (Year: 2018).*

Zhao et al. (Combining Layer-by-Layer Assembly with Electrodeposition of Silver Aggregates for Fabricating Superhydrophobic Surfaces, Langmuir 2005, 21, 4713-4716). (Year: 2005).*

Office Action for Korea Patent Application No. 10-2020-0022133, mailed Mar. 22, 2021.

American Chemical Society Applied Materials & Interfaces 2015, "Antiwetting Fabric Produced by a Combination of Layer-by-Layer Assembly and Electrophoretic Deposition of Hydrophobic Nanoparticles", Joung, Y.S et al., Aug. 27, 2015.

Journal of the American Ceramic Society, vol. 85, No. 9, "Electrophoretic Deposition Behavior of Aqueous Nanosized Zinc Oxide Suspensions", Fengqiu Tang et al., Sep. 30, 2002.

* cited by examiner

【FIG. 1】
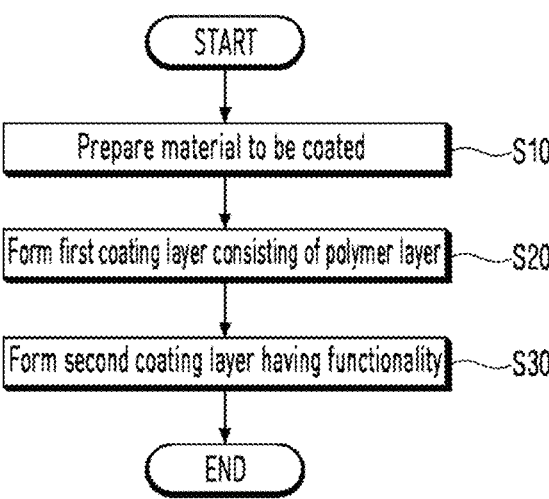

【FIG. 2】
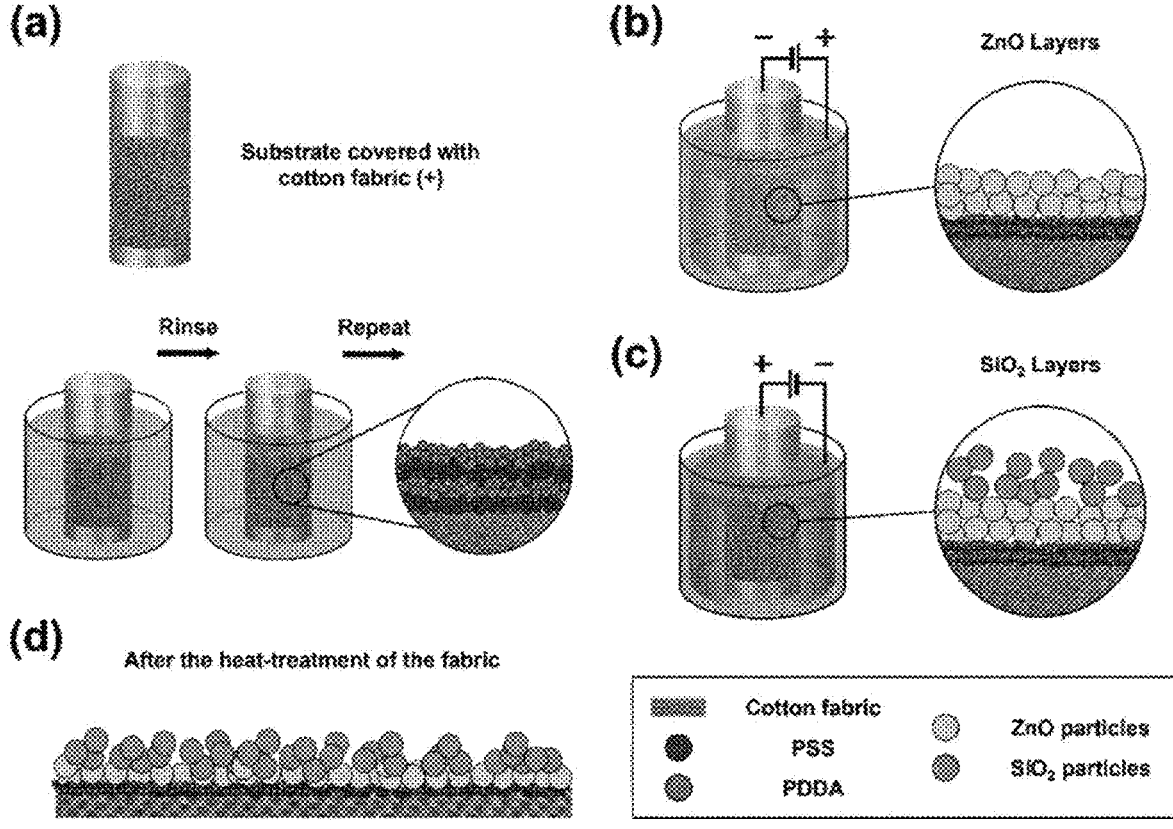

【FIG. 3a】

| Original Fabric | ZnO Coated fabric | | |
|---|---|---|---|
| | 1 min | 2 min | 3 min |

【FIG. 3b】
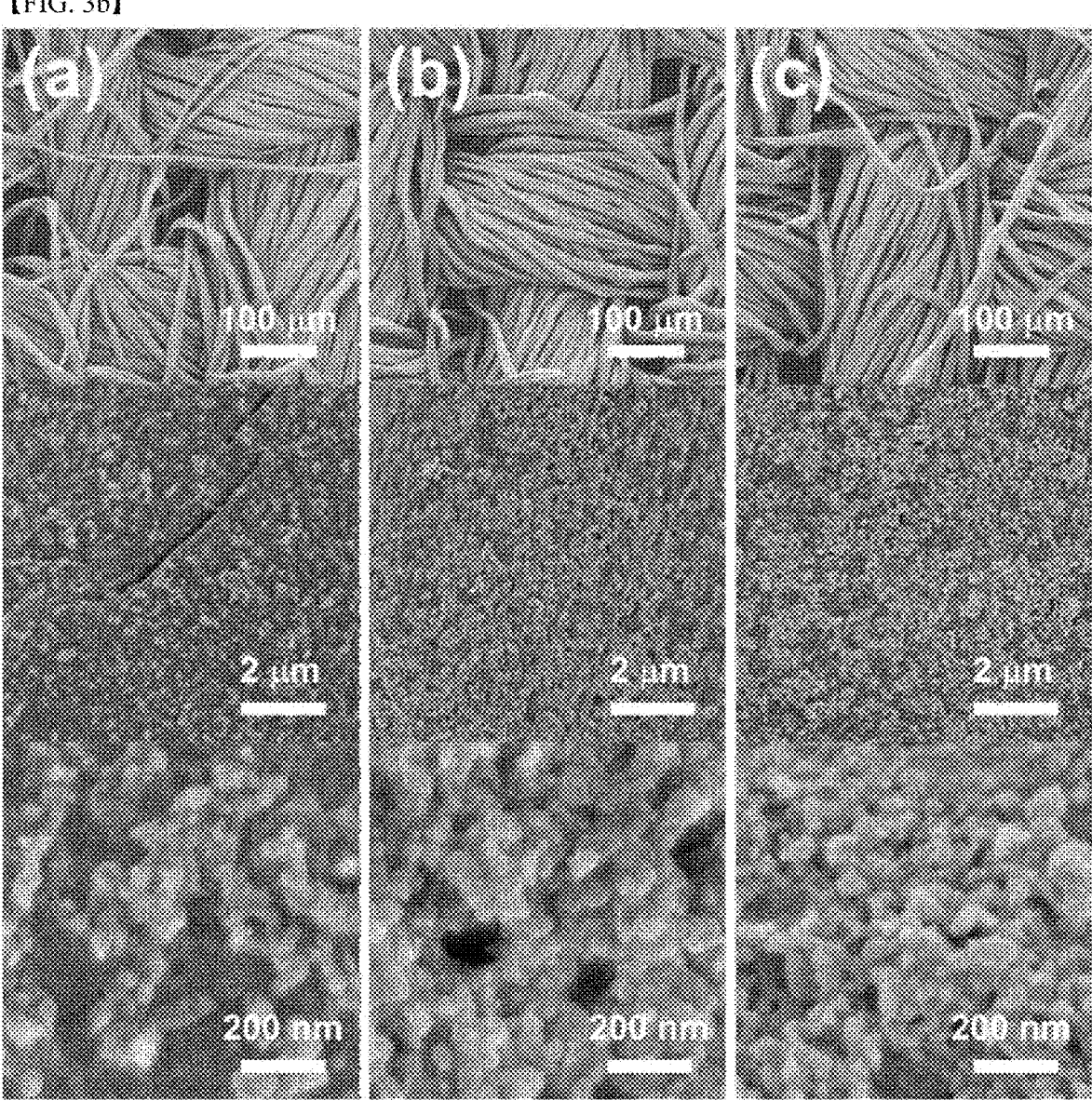

【FIG. 4】
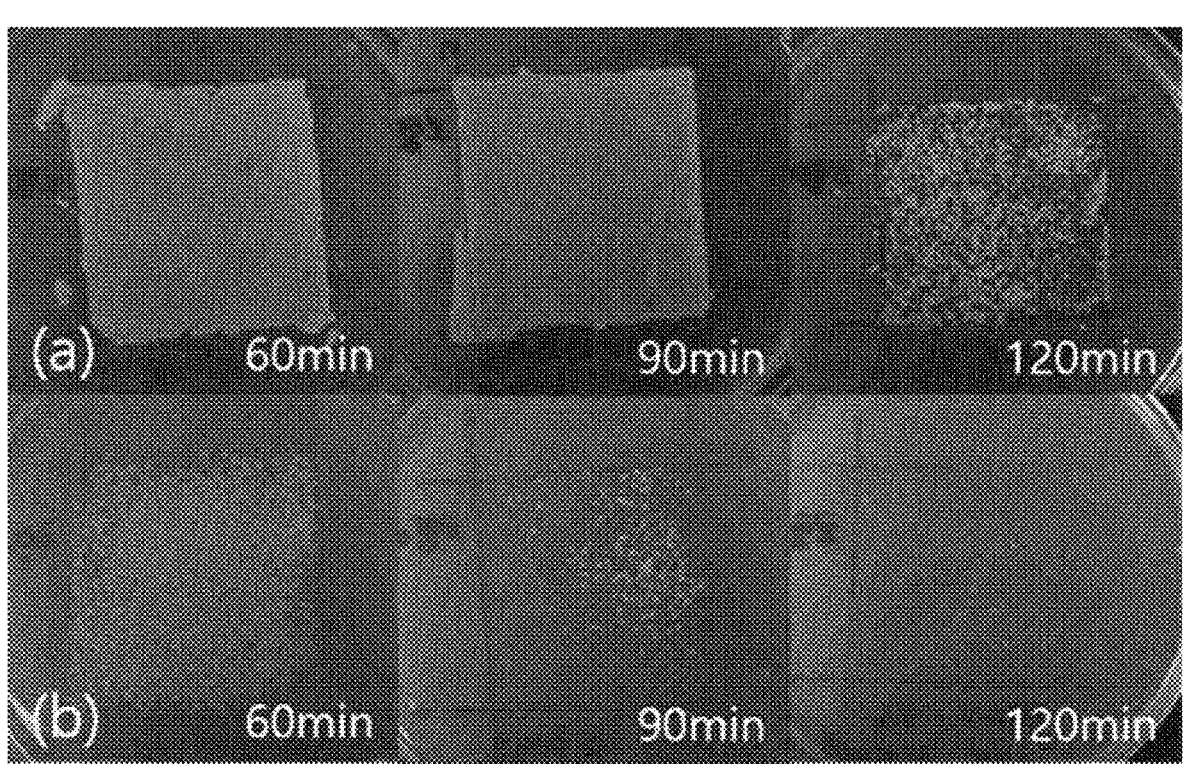

【FIG. 5】
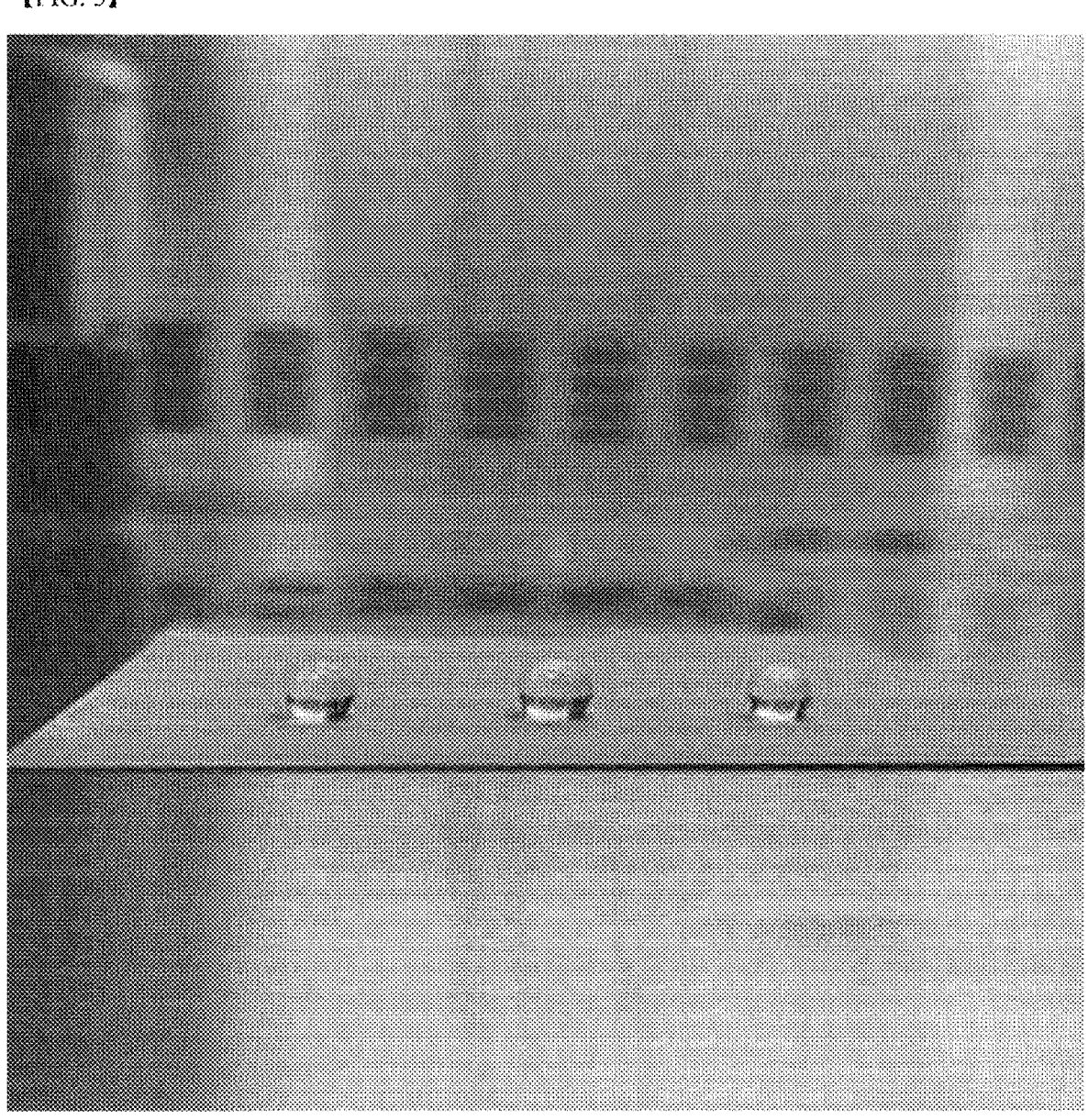

【FIG. 6】
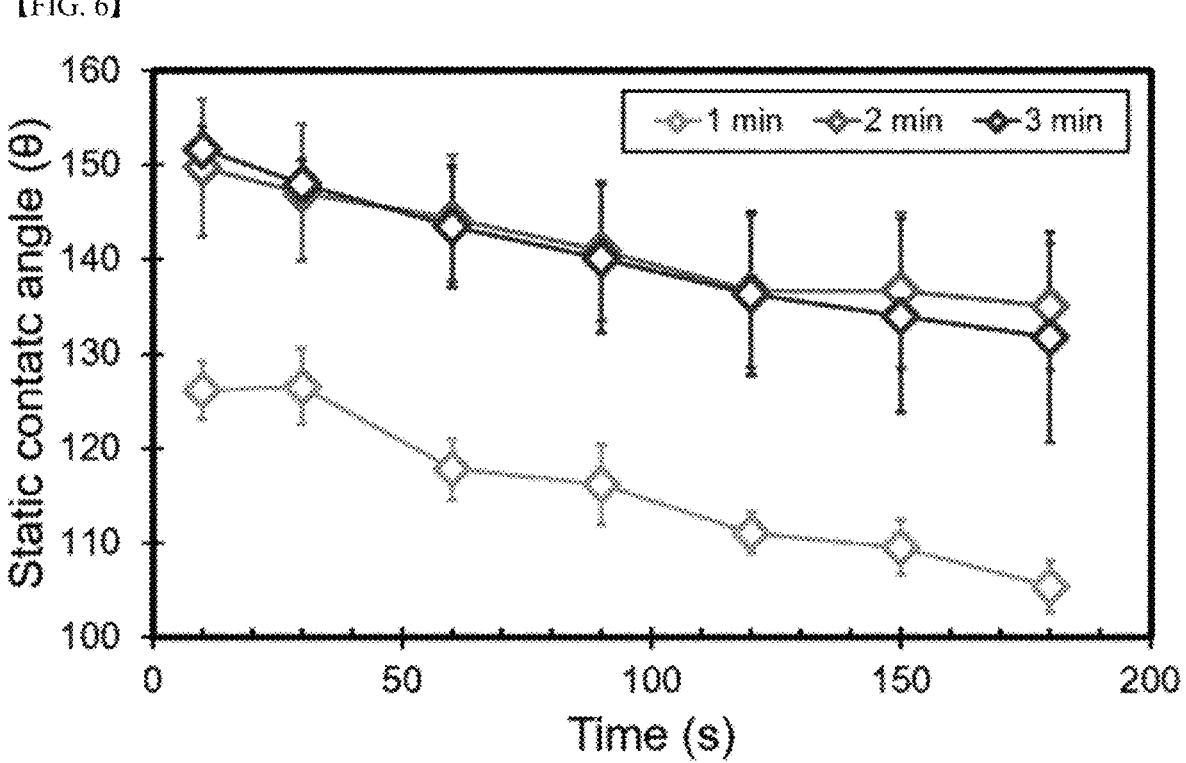

【FIG. 7】
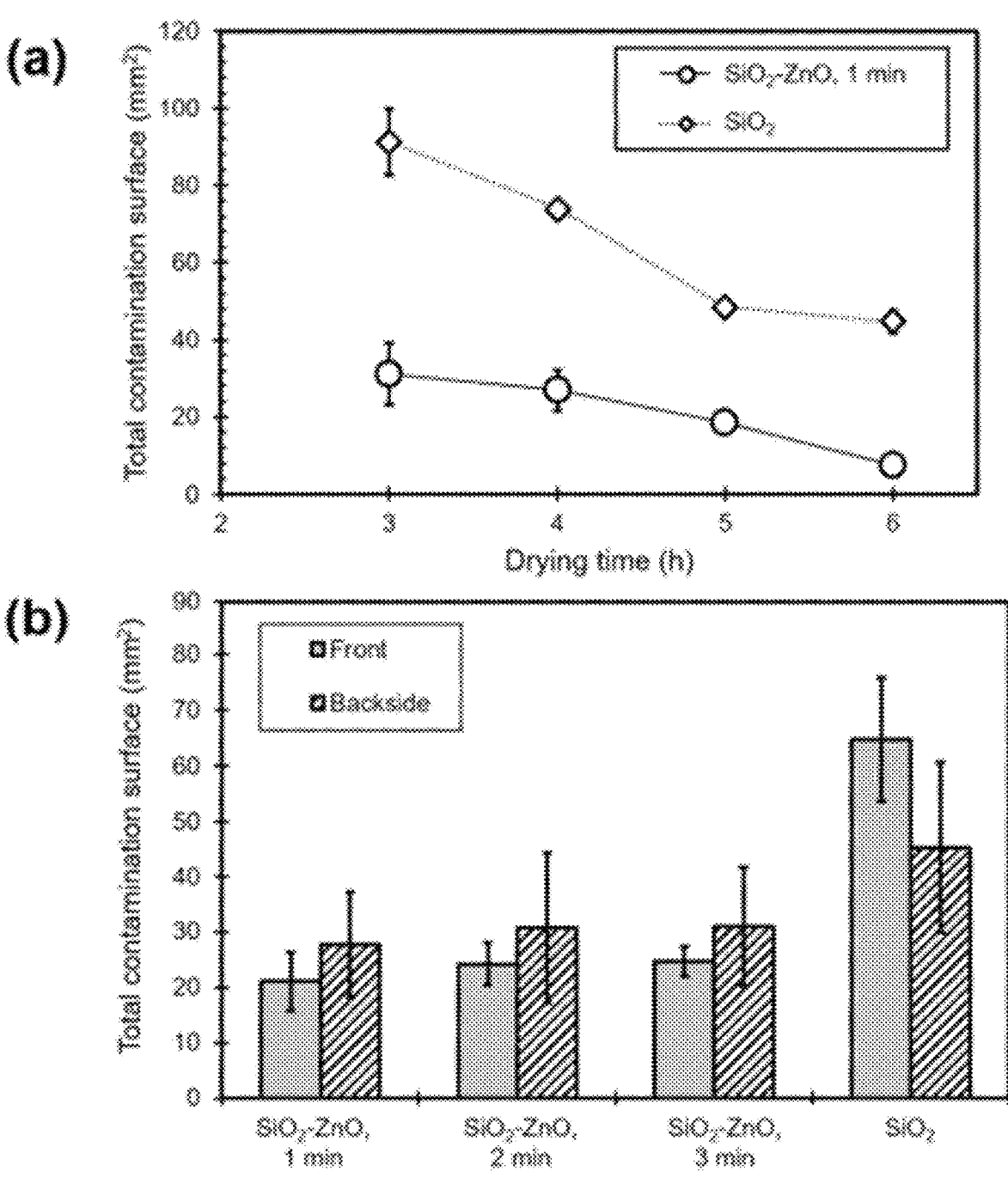

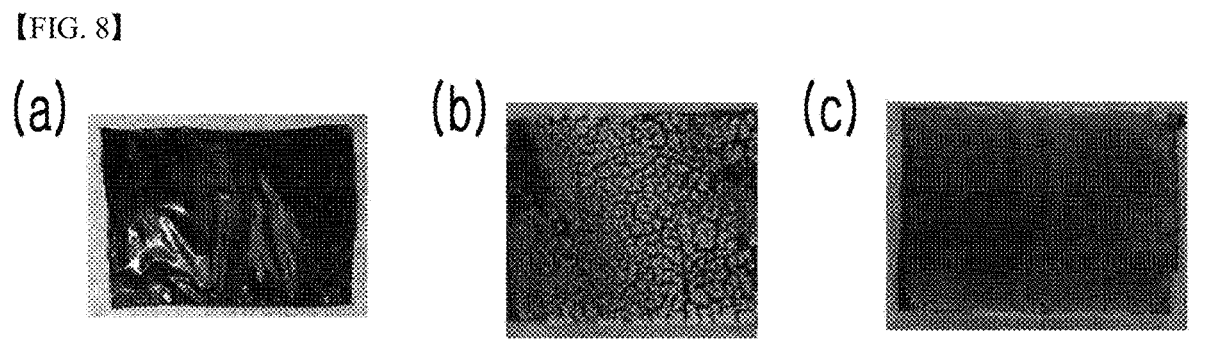

FUNCTIONAL MATERIAL AND METHOD FOR MANUFACTURING THE SAME

FIELD OF INVENTION

The present invention relates to a material with a variety of functions, such as an antimicrobial function or a waterproofing function, as well as a method for manufacturing the same.

BACKGROUND OF INVENTION

Functional fabrics (or textile materials, fabrics, etc.) used for industrial products such as garments, shoes, bags, jewelry, bedding, and other miscellaneous goods, and a filter that filters foreign matter requires a complicated and expensive manufacturing process and, as compared to unprocessed fabrics, involves disadvantages such as low productivity and high unit cost.

Accordingly, there is increasing demand for a functional material that is produced by coating an inexpensive material with any specific functional substance, thereby attaining mass production at a low cost.

Surface coating technology is generally classified into two types, that is, chemical and mechanical methods depending on a coating process.

The chemical method may deteriorate the quality of the coating over time and thus should be carefully conducted in treatment and progress. On the other hand, a process of applying functional particles by the mechanical method is to spray or apply the functional particles to a non-conductive surface of a filter or fabric, wherein coating thickness and uniformity are challenging to control and may cause loss of inherent properties of the material such as permeability or flexibility.

Accordingly, there is an urgent need for technology to realize a method for manufacturing a functional material that can overcome the disadvantages of the existing chemical or mechanical coating method while enabling mass production at a low cost.

SUMMARY OF INVENTION

Technical Problem to be Solved

An object of the present invention is to provide a method for manufacturing a functional material that can impart functional properties while maintaining inherent characteristics of the material by coating a surface of a non-conductive material with particles (in this patent, "particles" refer to "nanoparticles" and "microparticles") having functional properties.

Technical Solution

In order to solve the above problems, the present invention provides a method for manufacturing a functional material, which includes; preparing a material to be coated, wherein the material is a conductive material or a non-conductive material present on a conductive substrate; immersing the material in a polymer suspension having an electrical charge to form a first coating layer on the surface of the material; immersing the polymer-coated material in an electrolyte in which particles having functional properties ("functionality") are dispersed; and then forming a second layer by applying a DC voltage to two electrodes, wherein the electrodes are consist of the polymer-coated material or the conductive substrate as a first electrode, and a second electrode as a conductive substrate facing to the first electrode, so as to form a second coating layer above the first coating layer.

According to one embodiment, the non-conductive material may be a material to absorb the electrolyte or a material having a porous structure.

According to one embodiment, the formation of the first coating layer may include forming two or more layers by a lamination method (i.e., "layer-by-layer assembly"), wherein adjacent deposited layers are formed by immersing the same in a polymer suspension having opposite charges from the layers.

According to one embodiment, formation of the first coating layer may include: immersing the material having a positively charged surface in a poly(sodium 4-styrenesulfonate) (PSS) solution having a negative charge to form a first polymer coating layer; and immersing the material having the first polymer coating layer formed thereon in a poly(diallyl dimethyl diammonium chloride) (PDDA) solution having a positive charge to form a second polymer coating layer.

According to one embodiment, the method of the present invention may further include forming a plurality of polymer coating layers by repeatedly conducting the formation of the first polymer coating layer and the formation of the second polymer coating layer.

According to one embodiment, the formation of the second coating layer may include forming two or more layers by treating the particles having different functionalities through electrophoretic deposition.

According to one embodiment, if the non-conductive material is a fabric, the formation of the second coating layer may include: forming a first functional coating layer by immersing the fabric in the electrolyte in which first particles having antimicrobial properties are dispersed; and forming a second functional coating layer by immersing the fabric in the electrolyte in which second particles having hydrophobic properties are dispersed.

According to one embodiment, the formation of the first functional coating layer may use a polyethyleneimine solution as a dispersant.

According to one embodiment, if the non-conductive material is a fabric, the formation of the second coating layer may include: immersing the fabric in the electrolyte in which first particles having antimicrobial properties and second particles having hydrophobic properties are dispersed; and conducting electrophoretic deposition to form the second coating layer having antimicrobial properties and hydrophobic properties.

According to one embodiment, the first particles may be at least one selected from the group consisting of zinc oxide (ZnO), silver (Ag), gold (Au), copper oxide (CuO), titanium oxide ($TiO_2$) and magnesium oxide (MgO).

According to one embodiment, the second particles may be at least one selected from the group consisting of silicon dioxide (SiO2), zinc oxide (ZnO), titanium oxide ($TiO_2$), cadmium sulfide (CdS), and strontium titanate ($SrTiO_3$).

According to one embodiment, after the formation of the second coating layer, heat treatment of the above material may further be included.

According to one embodiment, the first coating layer may include a thermosetting polymer layer formed by immersing the material in the suspension in which the thermosetting polymer is dispersed, wherein the thermosetting polymer may include polyamide or polyvinylidene fluoride.

Further, the present invention may provide a functional material including: a conductive material or a non-conductive material, which is prepared on a conductive substrate, to be coated; and first and second coating layers successively formed on the surface of the material, wherein the first coating layer is formed by immersing the material in a charged polymer suspension, and the second coating layer is formed by immersing the material having the first coating layer in an electrolyte in which functional particles are dispersed, and then, applying a DC voltage to the substrate as a first electrode and a second electrode which is another electrode opposite to the above first electrode, thereby forming the second coating layer above the first coating layer.

Effect of Invention

The method for manufacturing a functional material of the present invention may impart functionality to a non-conductive material while maintaining inherent characteristics of the material by coating the surface of the non-conductive material with particles having a nano- or micro-scaled size.

Further, repeating a process of coating the functional material on the surface of the non-conductive material may impart a plurality of desired functions to the material and, at the same time, easily control the thickness of the functional material.

In addition, the method for manufacturing a functional material of the present invention may have effects of enabling production in a large area/large capacity in a short time by simplified processes while using a general material.

BRIEF DESCRIPTION OF DRAWINGS

FIG. 1 is a flowchart by stages illustrating the method for manufacturing a functional material according to an embodiment of the present invention.

FIG. 2 is a schematic diagram illustrating the method for manufacturing a functional material according to an embodiment of the present invention.

FIGS. 3a and 3b illustrate the result of ZnO coating by time according to an embodiment of the present invention.

FIG. 4 illustrates the experimental results of antimicrobial activity of the functional material manufactured according to an embodiment of the present invention.

FIG. 5 illustrates the experimental results of hydrophobic property of the functional material manufactured using hydrophobic silica ($SiO_2$) according to an embodiment of the present invention.

FIG. 6 illustrates the result of hydrophobic silica ($SiO_2$) coating by time according to an embodiment of the present invention.

FIG. 7 illustrates the results of an *E. coli* cell culture experiment according to an embodiment of the present invention.

FIG. 8 illustrates the result of applying functional particles to the surface of polypyrrole (PPY) conductive film.

DETAILED DESCRIPTION OF PREFERRED EMBODIMENTS OF INVENTION

Various modifications may be added to the present invention and different embodiments may be included. Therefore, specific embodiments will be illustrated in the drawings and described in detail in the description.

However, this is not intended to limit the present invention to specific embodiments, and it is to be understood that the present invention includes all changes, equivalents, and substitutes within the spirit and scope of the present invention.

FIG. 1 is a flowchart by stages illustrating the method for manufacturing a functional material according to an embodiment of the present invention.

As shown in FIG. 1, the method for manufacturing a functional material according to an embodiment of the present invention may include: preparing a material to be coated—a conductive material or a non-conductive material present on a conductive substrate—(S10); immersing the material in a polymer suspension having electric charge to form a first coating layer on the surface of the material (S20); immersing the coated material in an electrolyte in which microparticles having functionality are dispersed, and then, applying power to the conductive substrate as a first electrode, as well as a second electrode which is another electrode opposite to the first electrode, thereby forming a second coating layer on the first coating layer (S30).

In other words, in order to overcome a problem of difficulty in depositing a charged material present in an electrolyte on an electrode made of a typical non-conductive material by electrophoretic deposition (EPD), the method for manufacturing a functional material according an embodiment of the present invention may firstly form a first coating layer using a charged polymer and then form a second coating layer above the first coating layer by EPD.

Further, the material to be coated may be conductive and, in order to overcome non-uniformity of coating occurring when the above conductive material as an electrode is coated with functional microparticles by EPD, the first coating layer may be firstly formed using the charged polymer, followed by forming the second coating layer above the first coating layer by EPD.

At this time, if the second coating layer is formed on the surface of a non-conductive material by EPD using an electrolyte in which functional microparticles having a nano- or micro-scale size are dispersed, the functionality may be imparted while maintaining inherent characteristics of the material.

Meanwhile, in order to manufacture a functional material, firstly, a material to be coated may be prepared (S10).

Herein, the material may be conductive or may be non-conductive and provided on a conductive substrate. The material to be coated ("coating object") having imparted functionality may be conductive or non-conductive.

The conductive material or the conductive substrate is not particularly limited in terms of shape or substance thereof as long as it is intended to transfer electricity and, as shown in Table 1 below, may include, for example, a non-metallic substance such as carbon-containing vinyl, felt, etc., or at least one selected from the metal group consisting of stainless steel, titanium, nickel, silver, gold, platinum, etc.

TABLE 1

| Materials | |
|---|---|
| Conductive | Conductive yarn (carbon felt, graphite, Teflon), alloy (aluminum, copper, magnesium, duralumin . . .), titanium, stainless steel, nickel, silver, gold, platinum |

Further, the non-conductive material provided on the conductive substrate is also not particularly limited in terms of shape and substance thereof and, as shown in Table 2 below, may include, for example, at least one selected from the group consisting of synthetic resin such as polyester, cotton, fabric, paper, filter, membrane, etc.

TABLE 2

| Materials | |
| --- | --- |
| Non-conductive | Synthetic resin, fabric (cotton, polyester, nylon . . .), filter, paper, membrane |

However, the non-conductive material provided on the conductive substrate, according to an embodiment of the present invention, preferably has a porous structure or can absorb an electrolyte.

This is because an electric field can be easily generated across the non-conductive surface existing between two electrodes.

According to an embodiment of the present invention, in order to provide the non-conductive material on the conductive substrate, the non-conductive material may be attached to the conductive substrate. Alternatively, the conductive substrate may be rolled in the form of a rod, and the non-conductive material may be wrapped around the rolled conductive substrate. According to a specific embodiment, a thin titanium plate may be rolled and a fabric (for example, cotton fabric, polyester fabric, etc.) may be wrapped around the same and provided.

Such prepared material as the coating object may be immersed in a polymer suspension having a charged surface in order to form a first coating layer on the surface of the material (S20).

According to an embodiment of the present invention, in order to form the first coating layer on the non-conductive material, a lamination method (layer-by-layer assembly) may be used.

According to the lamination method, the surface of the non-conductive material may be modified and a thin film coating may be formed using a substance charged opposite to the above surface of the non-conductive material.

According to an embodiment of the present invention, polymers having positive or negative charges may be repeatedly laminated on the surface of the non-conductive material by turns according to electrostatic attraction. If the first coating layer is provided in plural, adjacent deposited layers may have opposite charges from each other. As such, repeatedly laminating the polymers may desirably adjust the thickness of the first coating layer as necessary.

Specifically, when the prepared non-conductive material has a positively or negatively charged surface, the material may be firstly immersed in a negatively or positively charged polymer suspension, followed by secondly immersing the material in another positively or negatively charged polymer suspension, thereby providing a first coating layer having two layers. Of course, repeating the above immersion process may produce a first coating layer having three or more layers. Alternatively, using a suspension including a mixture of different particles having various functions may prepare a first coating layer including the mixture of different particles by EPD at one time.

At this time, after each immersion process is finished, the remaining polymer is preferably removed by washing the surface of the non-conductive material with deionized water.

According to an embodiment of the present invention, a surface of titanium wrapped with fabric may be positively charged, and the positively charged material may be immersed in a negatively charged poly(sodium 4-styrene sulfonate) (PSS) solution for 2 to 4 minutes, preferably 3 minutes, to form a first polymer coating layer. Then, after washing the product for 10 seconds, the first polymer coating layer may be immersed in a positively charged poly(diallyldimethyl diammonium chloride) (PDDA) solution for 2 to 4 minutes, preferably 3 minutes, to form a second polymer coating layer, thereby providing a first coating layer composed of multiple layers.

Herein, the PSS solution may be prepared by dissolving 30% by weight ("wt. %") of PSS in deionized water, while the PDDA solution may be prepared by dissolving 35 wt. % of PDDA in deionized water.

An immersion time in the PSS or PDDA solution may be the optimum time induced by repetitive experiments so that charges are sufficiently deposited on the surface of a material. It is recommended to coat for at least 2 minutes, preferably 3 minutes or more. That is, a sufficiently long immersion time may be desirable for electrostatic deposition of the polymer. However, in order to form a uniform coating on the surface or to stably deposit the second coating layer on the surface, immersion is preferably conducted for at least 2 or 3 minutes. At this time, the immersion time may vary in consideration of characteristics of the surface to be coated and characteristics of particles.

Since the PSS solution and the PDDA solution have high surface charge, these may be deposited on the material according to stronger electrostatic attraction. Further, since the first coating layer made of a polymer substance is interposed between the above material and the second coating layer, mechanical bonding force therebetween may be improved. Specifically, the mechanical bonding force may further be improved through heat treatment.

Meanwhile, in order to impart functionality to the material on which the first coating layer is formed, the material may be immersed in an electrolyte in which particles having functionality are dispersed. Further, a DC voltage may be applied to a conductive material or a conductive substrate as a first electrode, as well as a second electrode which is another electrode opposite to the first electrode, thereby forming a second coating layer on the first coating layer (S30).

In this regard, particles may have desired functions to be imparted to the material and are not specifically limited. For example, one or more substances having different functions such as antimicrobial, hydrophobic, hydrophilic, conductive, pyrogenetic, heat resistance, flame resistance, and UV blocking properties may be used.

More specifically, the particles used for coating the material to impart functionality thereto may be any of the materials shown in Table 3 below or surface-treated with the same and, of course, the second coating layer may include a plurality of functional coating layers in order to impart different functions to the material.

TABLE 3

| Materials | |
| --- | --- |
| Antimicrobial properties | $ZnO$, Ag, Au, CuO, $TiO_2$, MgO |
| Hydrophobicity | Superhydrophobic $SiO_2$, Hydrophobic decanethiol-modified silver nanoparticles, Hydrophobic kaolin, PA-Ag, OA-$Fe_3O_4$ |
| Hydrophilicity | Superhydrophilic $SiO_2$, ZnO, $TiO_2$, CdS, $SrTiO_3$ |
| Conductivity | Ni, Au, Cu, Ag |
| Anti-inflammatory properties | Ceramics, urea, borax, guanidine sulfamate, antimony trioxide |

TABLE 3-continued

| Materials |
| --- |
| UV blocking properties | ZnO, TiO$_2$, CeO$_2$, CdS, SrTiO$_3$ |

Meanwhile, according to an embodiment of the present invention, electrophoretic deposition, that is, EPD may be used to form a second coating layer on the first coating layer.

When depositing the second coating layer above the first coating layer by EPD, deposition quality may be affected by the electrolyte in which particles are dispersed. Specifically, in the case of using a water-soluble electrolyte, even if the particles have a high surface charge when an electric field is generated, bubbles and heat are generated due to electrolysis, thus causing poor deposition quality.

Therefore, according to an embodiment of the present invention, the electrolyte used for forming the second coating layer is preferably an organic solvent generally used in electrophoresis. Alternatively, an organic solvent and an aqueous solution may be mixed and used. Specifically, for dispersion of hydrophobic SiO$_2$ particles, deionized water is preferably added to methanol. More particularly, an electrolyte in which 85 to 95% by volume ("vol. %"), preferably, 90 vol. % of methanol and 5 to 15 vol. %, preferably, 10 vol. % of deionized water are mixed may be prepared and provided to minimize effects of electrolysis or to acquire higher surface charge. Further, pH adjustment may be easily implemented when mixing the organic solvent and the aqueous solution, thereby effectively regulating the surface charge of the particles. Because of the functional particles proposed above, the organic solvent and the aqueous solution in a pure state may be used without pH adjustment.

Further, adjusting the intensity of the electric field formed by the DC voltage applied to the first and second electrodes may control a deposition rate and enable the deposition of particles having different levels of surface charge. That is, increasing the electric field intensity may improve the deposition rate and enable the deposition of particles having a low level of surface charge.

Further, the thickness of the second coating layer may be adjusted by altering a time for application of the electric field. Herein, the electric field intensity, a size of the electrode, a concentration of particles in the electrolyte, etc. are preferably constant.

Specifically, according to an embodiment of the present invention, if the material is a fabric, the material having the first coating layer formed thereon may be firstly immersed in an electrolyte, in which first particles having antimicrobial properties are dispersed, to form a first functional coating layer, followed by immersing the material having the first functional coating layer formed thereon in another electrolyte, in which second particles having hydrophobicity are dispersed, to form a second functional coating layer, whereby antimicrobial properties and hydrophobicity are imparted to the fabric. Of course, it is possible to form the second functional coating layer having hydrophobicity only without formation of the first functional coating layer having antimicrobial properties or, otherwise, to form the first functional coating layer having antimicrobial properties only without formation of the second functional coating layer having hydrophobicity.

According to an embodiment of the present invention, in order to form the first functional coating layer having antimicrobial properties, the material having the first coating layer formed thereon may be immersed in an electrolyte in which ZnO particles are dispersed.

In this regard, a dispersant may be added to the electrolyte, and the dispersant is preferably a polyethylenimine (PEI) solution. Since the size and surface charge of ZnO particles depend on pH value and strong acidic or basic electrolytes may damage the fabric, PEI is recommended to minimize a particle size while having high surface charge in the neutral pH range.

For instance, an electrolyte was prepared by dispersing 5 g/L of PEI solution and 2 g/L of ZnO particles in methanol. Herein, the PEI solution was prepared by dissolving 50 wt. % of PEI in water.

In this regard, a time for immersing the material in the electrolyte mixed with ZnO-PEI solution to form the first functional coating layer is not particularly limited, but, preferably in the range of 3 to 4 minutes at an electric field intensity of 5 V/cm to 10 V/cm, specifically, when an electric field of 7.5 V/cm is formed by applying a DC voltage of 30V between two electrodes at an interval of 4 cm.

As shown in FIG. 3a, even if the second coating layer is formed by sufficiently conducting EPD for 3 minutes in ZnO-PEI solution, no change in color of the material could be seen. Further, as shown in FIG. 3b, as a result of SEM (scanning electron microscopy) photographs, it could be seen that ZnO particles are most densely applied to the surface deposited for 3 minutes. Therefore, it is preferable to form a coating layer by EPD for 3 minutes or more, so as to have sufficient antimicrobial properties. However, in the case of deposition for more than 4 minutes, permeability or flexibility may be deteriorated, leading to loss of inherent properties of the material when the material is a fabric. Therefore, according to an embodiment of the present invention, deposition is preferably conducted for 3 or 4 minutes.

Further, in order to form a second functional coating layer having hydrophobicity, the material having the first functional coating layer formed thereon may be immersed in an electrolyte, in which SiO$_2$ microparticles, specifically polydimethylsiloxane (PDMS)-SiO$_2$ particles are dispersed.

For instance, another electrolyte was prepared by dispersing 1 g/L of hydrophobic silica (SiO$_2$) particles in the above electrolyte. At this time, the hydrophobic silica (SiO$_2$) used herein is a microparticle having a size of 14 nm.

In this regard, the second functional coating layer having hydrophobicity is formed. In fact, in order to impart super-hydrophobic function with a contact angle of 150° or more to water droplets, as shown in FIG. 5, an immersion time in the electrolyte in which hydrophobic silica (SiO$_2$) is dispersed, is preferably in the range of 2 to 3 minutes at an electric field intensity of 20 V/cm to 25 V/cm, specifically, when an electric field of 22.5 V/cm is formed by applying DC voltage of 90V between two electrodes at an interval of 4 cm.

However, in this case, since SiO$_2$ dispersed in the electrolyte is negatively charged, the previously voltage-applied electrode to form the first functional coating layer should be voltage-applied in opposite directions (see FIGS. 2 (b) and (c)).

Meanwhile, according to an embodiment of the present invention, after the formation of the second coating layer (S30), heat treatment of the material may be further included.

The first coating layer may be a polymer material, and mechanical bonding force between the non-conductive material and the second coating layer having functionality may be improved through heat treatment.

Therefore, the first coating layer preferably includes a thermosetting polymer layer. That is, the thermosetting polymer layer may be formed by immersing the material in a suspension in which the thermosetting polymer is dispersed. Herein, the thermosetting polymer may be at least one selected from the group consisting of polyamide, polyvinylidene fluoride, and the like.

Specifically, after the formation of the second polymer coating layer, the thermosetting polymer layer may be formed by immersing the coating layer in the suspension in which the thermosetting polymer is dispersed for a predetermined time, so as to form a thermosetting polymer layer. Of course, it is recommended to wash the surface of the second polymer coating layer with purified water before immersion in the suspension in which the thermosetting polymer is dispersed.

According to another embodiment, when forming the second coating layer (S30), a thermosetting polymer may also be added to the electrolyte and dispersed therewith, followed by immersing the material in the above electrolyte so that a thermosetting function may be imparted when the second coating layer (for example, the first or second functional coating layer) through EPD. Likewise, the thermosetting polymer may be at least one selected from the group consisting of polyamide or polyvinylidene fluoride, and the like.

Heat treatment in the heat treatment process may be performed by drying the material having the first and second coating layers formed thereon at room temperature to evaporate the residual electrolyte, and then, applying heat to the material at 100° C. or higher, preferably 140° C. to 160° C. using a hot press, thereby improving mechanical bonding force between the non-conductive material and the first coating layer, and/or between the first coating layer and the second coating layer.

Hereinafter, the present invention will be described in more detail through examples according to the present invention, but the scope of the present invention is not limited by the examples presented below.

Example 1

As shown in FIG. 2(a), a titanium substrate (formed by rolling a thin titanium plate into a cylindrical shape) having a surface covered with a positively charged cotton fabric was prepared, and this material was immersed in a negatively-charged poly(sodium 4-styrene sulfonate) (PSS) solution for 3 minutes, washed in purified water for 10 seconds, and then immersed again in a positively-charged poly(diallyldimethyl diammonium chloride) (PDDA) solution for 3 minutes, so as to form a first coating layer on the cotton fabric. Then, the cotton fabric was washed again in purified water for 10 seconds.

To an electrolyte prepared by mixing 90 vol. % methanol and 10 vol. % purified water, a PEI solution in which 50% by weight of polyethylenimine (PEI) is dissolved in water, followed by dispersing ZnO particles therein (that is, 2 g/L of ZnO particles dispersed in 5 g/L of PEI solution), was added to prepare a desired electrolyte. As shown in FIG. 2 (b), a cylindrical second electrode was provided in a water tank containing this electrolye and cylindrical titanium wrapped with the cotton fabric was arranged as the first electrode at a distance of 4 cm from the inside of the second electrode. Further, 30V DC voltage was applied to the first and second electrodes for 3 minutes in order to form a functional coating layer having antimicrobial properties ("antimicrobial coating layer"). Specifically, the first electrode positioned inside becomes the negative electrode.

Example 2

In the same manner as described in Example 1 above, the antimicrobial coating layer was formed. Thereafter, an electrolyte was prepared by mixing 90 vol. % of methanol and 10 vol. % of purified water, followed by dispersing 1 g/L of polydimethylsiloxane (PDMS)-$SiO_2$ particles (with a particle diameter of 14 nm) in the above electrolyte, thereby preparing a desired electrolyte. Then, as shown in FIG. 2 (c), in this electrolyte, the above first and second electrodes were provided, while leaving a gap of 4 cm between the first electrode and the second electrode. Further, 90V DC voltage was applied to the first and second electrodes for 2 minutes in order to form a functional coating layer having hydrophobicity ("hydrophobic coating layer"). However, the DC voltage is applied in the opposite direction to the voltage applied in Example 1. Specifically, the first electrode positioned inside becomes the positive electrode.

Consequently, as shown in FIG. 2(d), a first coating layer, which is a polymer material, and a second coating layer having antimicrobial properties and hydrophobicity were sequentially laminated on the non-conductive cotton fabric.

Example 3

As shown in FIG. 2(a), a titanium substrate (formed by rolling a thin titanium plate into a cylindrical shape) having a surface covered with a positively charged cotton fabric was prepared, and this material was immersed in a negatively-charged PSS solution for 3 minutes, washed in purified water for 10 seconds, and then immersed again in a positively-charged PDDA solution for 3 minutes, so as to form a first coating layer on the cotton fabric. Then, the cotton fabric was washed again in purified water for 10 seconds.

In an electrolyte prepared by mixing 90 vol. % methanol and 10 vol. % purified water, 1 g/L of polydimethylsiloxane (PDMS)-$SiO_2$ particles (with a particle diameter of 14 nm) were dispersed to prepare a desired electrolyte. As shown in FIG. 2 (b), in this electrolyte, a cylindrical second electrode was provided and the cylindrical titanium wrapped with the cotton fabric was disposed as a first electrode inside the second electrode, while leaving a gap of 4 cm between the first electrode and the second electrode. Further, 90 DC voltage was applied to the first and second electrodes for 3 minutes in order to form hydrophobic coating layer.

Experimental Example 1

The antimicrobial properties of the original fabric and the functional fabric coated with only ZnO particles according to Example 1 were compared.

FIG. 4 (a) illustrates the antimicrobial activity test results obtained by E. coli cell culture experiments on the original fabric, and FIG. 4 (b) illustrates the antimicrobial activity test results obtained by E. coli cell culture experiments on the fabric coated with only ZnO microparticles.

In this regard, each E.coli cell culture experiment was conducted for several minutes under the condition of applying 1 ml of E.coli culture solution having an absorbance of 0.01A (ODE 600nm), which was measured using a spectrometer. Specifically, the functional fabric were was left in E.coli culture solution at intervals of 60 minutes, 90 minutes, and 120 minutes, and then the antibacterial performance was compared.

Referring to FIG. 4 (*b*), it could be seen that *E. coli* decreased as the *E. coli* application time passed in the *E. coli* culture experiment for the functional fabric manufactured by coating with ZnO particles only according to Example 1. In particular, after 120 minutes, *E. coli* was almost invisible. Specifically, 21 CFUs/cm$^2$ of *E. coli* existed after 90 minutes while only 1 CFUs/cm$^2$ of *E. coli* existed after 120 minutes.

On the other hand, referring to FIG. 4 (*a*), the original fabric showed that more than 80% of E. coli survived even after the lapse of time. That is, 131 CFUs/cm$^2$ of *E. coli* still existed after 120 minutes.

Consequently, it could be confirmed that the functional fabric manufactured in Example 1 had better antimicrobial effects than the original fabric.

Experimental Example 2

According to Example 2, 6 μl of deionized water was dropped on the surface of the functional material manufactured by further coating SiO$_2$ functional particles on the ZnO deposition layer, and the results are shown in FIGS. 5 and 6.

Referring to FIG. 6, a contact angle of deionized water to the surface of the functional material obtained in Example 2 reached 150° or more, whereby the surface of the functional material, according to the present invention, exhibited hydrophobicity.

Experimental Example 3

With regard to the functional fabric manufactured by coating the material with both ZnO particles and SiO$_2$ particles according to Example 2, as well as the functional fabric manufactured by applying only SiO$_2$ particles without application of ZnO particles according to Example 3, *E. coli* cell culture experiments were implemented, and the results are shown in FIG. 7.

As shown in FIG. 7 (*a*), the surface of the functional fabric according to Example 2 exhibited higher antimicrobial performance than the surface of the functional fabric manufactured by coating the material with only the SiO$_2$ particles according to Example 3.

Further, as shown in FIG. 7 (*b*), it could be seen that, even though the surface was modified by varying a deposition time during EPD, a contamination area in front and back surfaces of the functional fabric manufactured by applying both ZnO particles and SiO$_2$ particles was smaller than that of the functional fabric manufactured by applying only SiO$_2$ particles.

Consequently, the functional fabric manufactured by coating the material with both ZnO particles and SiO$_2$ particles does not lose antimicrobial properties but exhibits both hydrophobicity and antimicrobial properties.

Example 4

FIG. 8 illustrates the result of applying the functional particles to the surface of polypyrrole (PPY) conductive film.

More particularly, FIG. 8 (*a*) is a diagram showing a PPY film prepared for coating, wherein the PPY before the coating is black. Due to electrical conductivity of the PPY film, particles having hydrophobicity were applied as shown in FIG. 8 (*b*) through EPD. That is, FIG. 8 (*b*) shows a result of applying and drying the hydrophobic silica (SiO$_2$) particles which were dispersed in the electrolyte through EPD, wherein the PPY film was directly used as an electrode and an electric field was generated between the above electrode and another electrode opposite thereto.

Further, FIG. 8 (*c*) shows a result of firstly coating the PPY film with a polymer layer by a lamination method ("layer-by-layer assembly") and then coated with hydrophobic silica (SiO$_2$) particles through EPD.

Consequently, when using EPD only as shown in FIG. 8 (*b*), the coating layer can be obtained faster than that obtained according to a combination of layer-by-layer assembly and EPD as shown in FIG. 8 (*c*). However, as shown in FIG. 8 (*c*), it could be seen that the combination of layer-by-layer assembly and EPD has better coating uniformity than the other case.

The invention claimed is:

1. A method for manufacturing a functional material, comprising:

preparing a material to be coated, wherein the material is a conductive material or a non-conductive material present on a conductive substrate;

immersing the material in a polymer suspension having an electric charge to form a first coating layer on the surface of the material;

immersing the polymer-coated material in an electrolyte in which particles having functional properties ("functionality") are dispersed, and then forming a second coating layer by applying power a DC voltage to two electrodes;

wherein the electrodes consist of the polymer-coated material or the conductive substrate as a first electrode, and a second electrode as a conductive substrate facing the first electrode,-to form the second coating layer above the first coating layer wherein (1) the second coating layer is formed by forming first and second functional layers with specific particles with different functionalities using electrophoretic deposition (EPD) and (2) when forming the second functional coating layer, polarities of a voltage applied to the electrodes are reversed from polarities used for the first functional coating layer;

wherein the method further comprises forming an interfacial layer on the first coating layer by immersing the material into a suspension substantially consisting of a pure dispersion of a thermosetting polymer;

wherein the interfacial layer is configured to promote adhesion between the first coating layer and the subsequently deposited second coating layer; and wherein functional particles of the second coating layer deposited via the EPD are distributed substantially evenly on a boundary surface of the interfacial layer.

2. The method according to claim 1, wherein the non-conductive material is a material to absorb the electrolyte or a material having a porous structure.

3. The method according to claim 1, wherein the formation of the first coating layer includes forming two or more layers by a lamination method ("layer-by-layer assembly"), wherein adjacent deposited layers are formed by immersing the same in the polymer suspension having opposite charges from the layers.

4. The method according to claim 1, wherein formation of the first coating layer includes:

immersing the material having a positively charged surface in the polymer suspension comprising a poly (sodium 4-styrene sulfonate) (PSS) solution having a negative charge to form a first polymer coating layer; and immersing the material having the first polymer coating layer formed thereon in the polymer suspension comprising a poly (diallyldimethyl diammonium chloride) (PDDA) solution having a positive charge to form a second polymer coating layer.

5. The method according to claim 4, further comprising:
forming a plurality of polymer coating layers by repeatedly conducting the formation of the first polymer coating layer and the formation of the second polymer coating layer.

6. The method according to claim 1, wherein, if the non-conductive material is a fabric, the formation of the second coating layer includes:
forming a first functional coating layer by immersing the fabric in the electrolyte in which first particles having antimicrobial properties are dispersed; and
forming a second functional coating layer by immersing the fabric in the electrolyte in which second particles having hydrophobicity are dispersed.

7. The method according to claim 6, wherein formation of the first functional coating layer uses a polyethylenimine solution as a dispersant.

8. The method according to claim 1, wherein, if the non-conductive material is a fabric, formation of the second coating layer includes:
immersing the fabric in the electrolyte in which first particles having antimicrobial properties-and second particles having hydrophobicity are dispersed; and
conducting electrophoretic deposition (EPD) to form the second coating layer having antimicrobial properties and hydrophobicity.

9. The method according to claim 6, wherein the first particles are at least one selected from the group consisting of zinc oxide (ZnO), silver (Ag), gold (Au), copper oxide (CuO), titanium oxide (TiO$_2$) and magnesium oxide (MgO).

10. The method according to claim 6, wherein the second particles are at least one selected from the group consisting of silicon dioxide (SiO$_2$), zinc oxide (ZnO), titanium oxide (TiO$_2$), cadmium sulfide (CdS) and strontium titanate (SrTiO$_3$).

11. The method according to claim 1, further comprising heat treatment of the functional material after the formation of the second coating layer.

12. The method according to claim 11,
wherein the thermosetting polymer includes polyamide or polyvinylidene fluoride.

13. The method according to claim 11, wherein the formation of the second coating layer includes immersing the material in the electrolyte in which a thermosetting polymer is dispersed, wherein the thermosetting polymer includes polyamide or polyvinylidene fluoride.

14. The method according to claim 8, wherein the first particles are at least one selected from the group consisting of zinc oxide (ZnO), silver (Ag), gold (Au), copper oxide (CuO), titanium oxide (TiO$_2$) and magnesium oxide (MgO).

15. The method according to claim 8, wherein the second particles are at least one selected from the group consisting of silicon dioxide (SiO$_2$), zinc oxide (ZnO), titanium oxide (TiO$_2$), cadmium sulfide (CdS) and strontium titanate (SrTiO$_3$).

* * * * *